United States Patent [19]

Dittmeier et al.

[11] Patent Number: 5,312,672
[45] Date of Patent: May 17, 1994

[54] SEALING STRIP FOR WALL AND FLOOR JOINTS

[75] Inventors: Stewart B. Dittmeier, Wells, Vt.; Samuel E. Sher, Rockaway, N.J.

[73] Assignee: Norton Company, Worcester, Mass.

[21] Appl. No.: 995,629

[22] Filed: Dec. 21, 1992

[51] Int. Cl.$^5$ ............................................... B32B 9/00
[52] U.S. Cl. .................................. 428/192; 428/158; 428/159; 428/160; 52/396.06
[58] Field of Search ........................... 428/192; 52/396

[56] References Cited

U.S. PATENT DOCUMENTS

| | | | |
|---|---|---|---|
| 2,068,035 | 1/1937 | Meyer | 72/106 |
| 3,179,026 | 4/1965 | Crone | 52/396 |
| 4,030,852 | 6/1977 | Hein | 52/396 |

FOREIGN PATENT DOCUMENTS 1242975 of 1960 France.

Primary Examiner—Patrick J. Ryan
Assistant Examiner—Kam F. Lee
Attorney, Agent, or Firm—Brian M. Kolkowski

[57] ABSTRACT

A compressible, flexible, resilient wedge shaped sealing strip for maintaining conforming sealing engagement with opposing spaced walls of various structures and sealing joints therebetween has a flexible resilient hollow body with an outer layer of foam both made of a material having the ability to recover from a compressed state and thus continuously exert and force the sealing strip into sealing engagement with the opposing spaced walls of the structure.

12 Claims, 1 Drawing Sheet

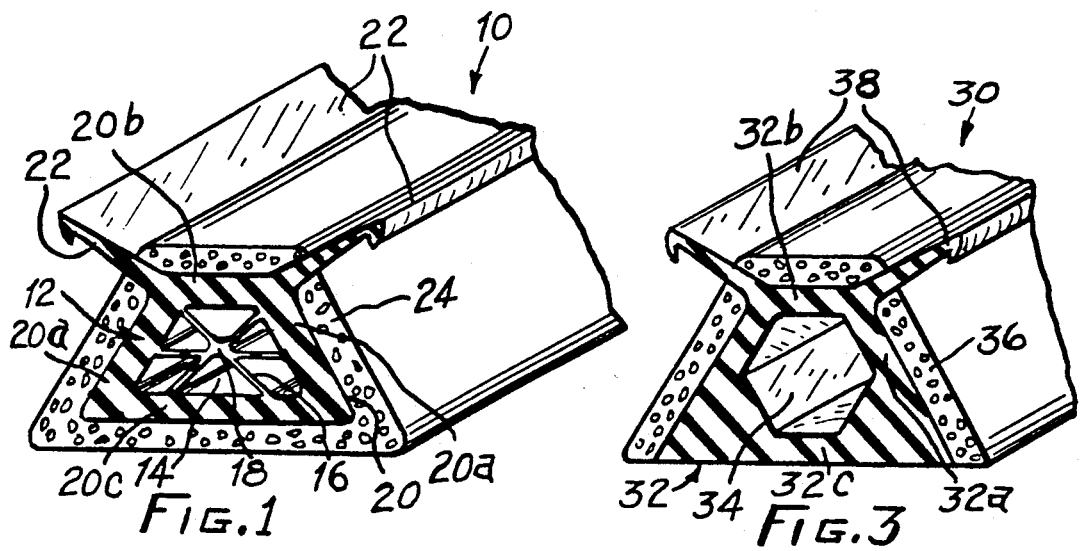
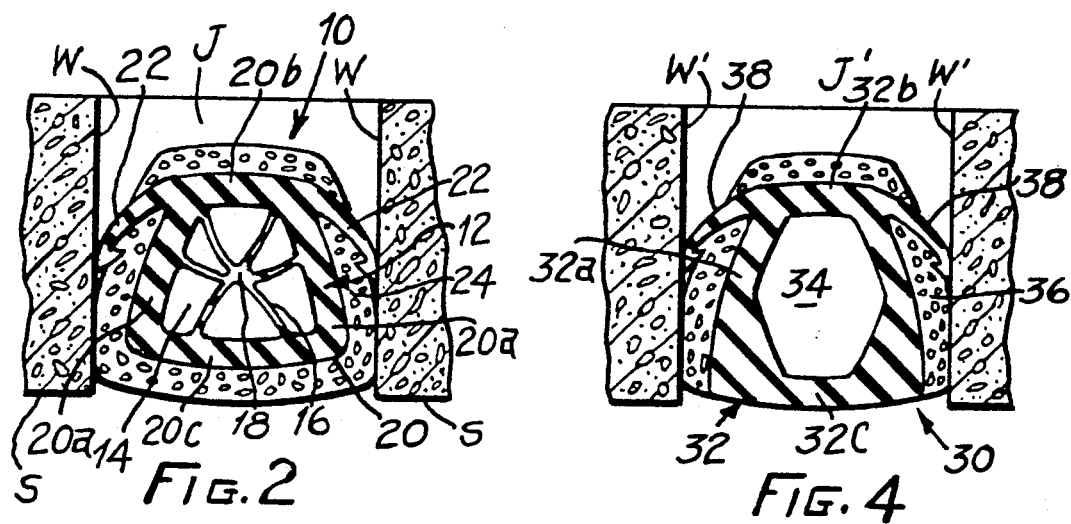
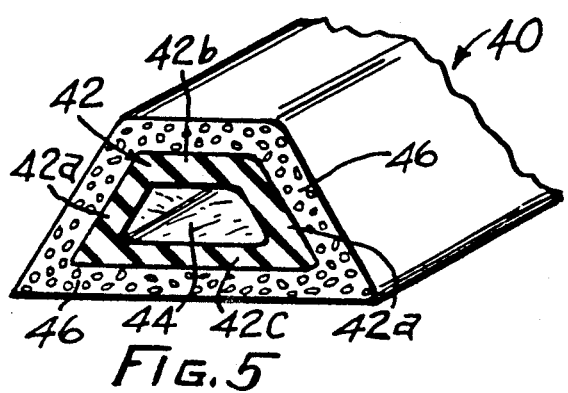

5,312,672

SEALING STRIP FOR WALL AND FLOOR JOINTS

TECHNICAL DISCLOSURE

A compressible, flexible, and resilient wedge shaped sealing strip of an elastomer material for both horizontal and vertical joints in exterior walls and floors has an inner hollow resilient flexible body or tube covered by an outer layer of surface conforming flexible and resilient cellular foam for sealing engagement with opposing spaced adjacent walls.

BACKGROUND OF THE INVENTION

1. Field of the Invention

The invention relates to moisture and air seals for sealing joints between structures.

2. Description of the Prior Art

Joints between sections of floors and walls are necessary to accommodate for movement caused by thermal and seismic changes thereto. Hence, the joints must be sealed to prevent penetration of moisture that would be deleterious to the structure. Heretofore, joints were sealed against the penetration of air and moisture by pumping a curing type mastic such as silicone, urethanes, butyl or polysulfides over a supporting backer rod extrusion typically of polyethylene foam first placed into the joint and filling the void remaining therebetween. The mastic is then "tooled" or shaped to enhance the seal and for aesthetics.

Another method uses an open cell elastomeric material such as urethane foam saturated by a resin or viscous bitumen to seal the foam substrate. It is then precompressed and placed into the joint whereupon it expands to fill and seal the joint.

Both of the above mentioned methods are extremely labor intensive, requiring skilled applicators and much labor to cleanup, all of which makes the installation thereof more time consuming and costly than the applicants' device.

The applicants' invention is a significant improvement over the above mentioned prior art seals. It consists of a compressible wedge shaped sealing strip comprising an extruded inner hollow flexible resilient body or tube of flexible resilient elastomeric material such as rubber, thermoplastic rubber, PVC (polyvinyl chloride), silicone, EPDM (ethylene-propylene terpolymer), nitrile rubber, SBN (styrene-butadiene-nitrile) or a flexible resilient plastic or metal body and a layer of elastomeric cellular foam material which alternatively may cover at least the two opposing inclined sides of the hollow body and conformably engage the opposing side walls of the joint.

A pair of thin flexible barb-like structures or retainers may be provided at opposite sides of the inner hollow body and assist to lock the sealing strip in place. The resilient flexible hollow body or tubular member can be of various geometric shapes and designed to allow it to be significantly compressed and to enhance its recovery from the compressed state. It is the reliability of its ability to recover from a compressed state that will allow it to be properly installed in less time and assure its long term sealing ability of the joint at lower cost.

SUMMARY OF THE INVENTION

A compressible and self expanding wedge shaped sealing strip preferably of trapezoidal cross sectional shape adapted for insertion into and sealing joints comprises an inner resilient and flexible hollow body or tube made of impervious, flexible, and resilient material, having integral side walls extending around an internal passage. The exterior of two or more portions of the sidewall are covered by an outer layer of flexible and resilient cellular elastomeric foam material adapted for sealingly conforming to and engaging the opposing sides or surfaces of the joint. Preferably, two opposing portions of the sidewall are inclined and diverge outwardly from an inner narrow portion to an outer wider portion of the sidewall. Preferably, a plurality of integral thin flexible and resilient barb-like seal retainer fins protrude from the opposite inclined portions of the sidewall adjacent the inner narrow portion of the sidewall for engaging the opposing sides or walls of the joint and thereby enhancing the grip of the sealing strip in the joint.

Alternatively, the internal passage in the inner hollow body may be of a different cross sectional shape than the sidewall of the body and may comprise a plurality of internal passages separated by integral flexible resilient ribs extending between and to the opposite portions of the sidewall for increasing the resiliency of and the ability of the hollow body or tube to recover from a compressed state.

BRIEF DESCRIPTION OF THE DRAWING

FIG. 1 is an enlarged perspective view of one embodiment of a sealing strip constructed according to the invention;

FIG. 2 is an enlarged cross-sectional view showing the sealing strip of FIG. 1 installed in a joint and sealingly engaging the opposing sides of the joint;

FIG. 3 is an enlarged perspective view of another embodiment of a sealing strip constructed according to the invention;

FIG. 4 is an enlarged cross-sectional view showing the sealing strip of FIG. 3 installed in a joint and sealingly engaging opposing sides of the joint; and FIG. 5 is an enlarged perspective view of still another embodiment of a sealing strip constructed according to the invention.

DESCRIPTION OF THE PREFERRED EMBODIMENT(S)

Shown in FIG. 1 is an elongated wedge shaped compressible and self expandable sealing strip 10 comprised of a compressible, flexible and resilient inner hollow wedge shaped body or tube 12 preferably of trapezoidal shape. The hollow body 12 may have one or more internal passages 14 of various geometric shapes surrounded and separated by a plurality of thin flexible expansion ribs 16 extending from a central hub 18 and integrally connected to spaced inner portions of the surrounding outer wall 20 of the elongated hollow body 12. Sidewall 20 of the hollow wedged shaped body 12 has two (2) opposing oppositely inclined side wall portions 20a diverging outwardly from a narrow inner wall portion 20b to an outer wider wall portion 20c. Depending on size, the thickness of the wall portions are from 1/16" to ⅜" (2 mm to 12 mm). Extending from the oppositely inclined side wall portions 20a are at least one pair of integral flexible retaining means for engaging opposing sides of a joint and to hold the compressed sealing strip 10 in place as shown in FIG. 2. The retaining means comprises thin flexible outer fins 22, each of which extends from opposite junctions of the inner narrow side wall portions 20b and the inclined wall portions 20a. Preferably the thin flexible retainer fins 22 protrude outwardly at an angle to the wall 20 and taper to pointed or barb-like end portions that extend to at least the plane and width of the outer wider side wall portion 20c. The flexible retainer fins 22 also serve to protect the outer layer of foam during insertion of the sealing strip into a joint.

Covering at least the two inclined side wall portions 20a and alternatively all portions 20a, 20b, and 20c of the outer wall 20 is a layer of flexible and resilient cellular foam material 24. The layer of cellular foam material is provided so that the compressible sealing strip will easily conform to and fully sealingly engage the typically rough and uneven surfaces on opposite sides of the joint and which will not absorb air or moisture.

The flexible resilient inner hollow body or tube 12 including the integral ribs 16, center 18, wall portions 20a, 20b, and 20c, and retainers 22, is preferably extruded from a material such as thermoplastic rubber. Likewise, the closed cell foam layer 24 may be laminated to but preferably applied by sequentially extruding it over one or more wall portions of the body wall 20. The compressible cellular foam layer is preferably an elastomeric material such as foamed polyvinyl chloride, foamed polyethylene, foamed neoprene, foamed acrylic, foamed polypropylene, foamed silicone, foamed urethane, foamed rubber, foamed EPDM, foamed nitrile rubber, or foamed thermoplastic rubber, and from 1/32" to ¾" (0.8 mm to 19 mm) thick.

In FIG. 2 there is shown the expandable sealing strip 10 of FIG. 1 described above compressed and wedged into a joint J and sealingly engaging the opposing spaced walls W to seal off the space or joint J therebetween. To apply, a sealing strip 10 of sufficient length is first compressed and its narrower inner side portion inserted into the joint or space J whereupon it becomes deformed and the flexible retainer means 22 are bent or moved downward by the sliding engagement with the opposing walls W as shown in FIG. 2. Also, the outer layer 24 of foam is compressed against and conforms to the contour of exterior surface of the walls W and the outer wider wall portion 20c and the foam layer 24 thereon bulges outwardly to essentially the plane of the exterior or exposed face surfaces S of the adjacent structures. It can be seen and understood that in its compressed and slightly deformed state that the elastic flexible resilient sealing strip 10 retains its tendency to recover therefrom and therefor exerts a constant outward force against the opposing walls W. Thus, the cellular foam layer remains compressed and in conformity with the walls and any thermal expansion or contraction of the opposing structures will be automatically compensated for by the compressed resilient body 12. Following compression of the body 12 the flexible and resilient internal expansion ribs 16 are flexed and bent from their initial position and aid in opposing the compression and thereby exerts an additional expanding force against the surrounding flexible and resilient side wall 20 of the inner body or tube 12. Obviously, the sealing strip can be made in various sizes as well as custom made, and the size of each sealing strip 10 will depend on the width, depth, and length of the joint to be sealed off. Typically, a joint ¾" (18 mm) wide and 2" (5 cm) deep can be sealed off by a sealing strip 10 1" (25 mm) by 1" (25 mm) in height.

As seen in FIG. 2 when the sealing strip or gasket 10 is compressed and inserted into the joint the retainers 22 first contact the opposing walls W and are bent downwardly. Also the compressed hollow body 12 of trapezoidal shape becomes elongated and thereby causes the side wall portions 20a, 20b, and 20c, to become deformed and bulge outwardly thereby maintaining the outer foam layer 24 in sealing contact with the opposing spaced walls W of the adjacent structures.

Another embodiment of a compressible, flexible, and resilient sealing strip 30 made according to the invention is shown in FIG. 3. It is similar to the sealing strip 10 in shape, size, and construction, with the following exceptions: the trapezoidal or wedge shaped flexible and resilient hollow body or tube 32 has an internal passage 34 of polygonal shape, there are no internal expansion ribs, a layer of foam 36 extends only over the opposing inclined side wall portions 32a, and the narrower inner side wall portion 32b while the outer wider side wall portion 32 of the body 32 is exposed.

In FIG. 4 there is shown the sealing strip 30 compressed and inserted into a Joint $J^1$ between opposing wall $W^1$ whereupon the hollow resilient body 32 becomes somewhat deformed and elongated and has the constant tendency to recover and expand. Hence, the compressed body 32 constantly forces the layer 36 of cellular foam elastomer material into sealing and conforming engagement with the opposing side walls $W^1$ of the structures. Likewise, the flexible and resilient nature of the compressed body 32 and layer 36 will allow and compensate for expansion and contractions of the structure. Although the sealing strip or gasket 30 is shown to have a pair of flexible and pointed barb-like retainers 38 protruding therefrom, to hold it in place, in some instances the retainers 38 may be found to be unnecessary, and thus eliminated, as shown in the embodiment disclosed in FIG. 5.

The wedged shaped sealing strip 40 shown in FIG. 5 is similar in most respects to the sealing strips 10 and 30 of FIG. 1 and 2 with the exception that it is absent of both the flexible expansion ribs 16 and the retainer fins 22 and 38. It has an inner hollow body or tube 42 and an internal passage 44 of trapezoidal shape and is completely surrounded by a layer 46 of cellular foam elastomer material. The body 42 has opposed inclined wall portions 42a diverging outwardly from an inner narrow wall portion 42b to an outer and wider wall portion 42c all surrounding the internal passage 44.

When compressed and inserted in a joint it will become deformed, elongated, and conform to the opposing walls of a structure similar to that shown in FIGS. 2 and 4 and maintained therein by frictional engagement with the walls without the aid of retainer fins 22 or 38. The tendency of the compressed hollow body 42 to recover from its compressed state maintains the sealing strip 40 in conforming sealing engagement with the opposing spaced side walls of the structure. Thus, the joint therebetween will be sealed against the entrance of moisture and air regardless of the expansion and contraction thereof.

The flexible and resilient inner hollow bodies or tubes 12, 32, and 42, may be made of natural rubber, synthetic rubber, neoprene, acrylic, thermoplastic rubber, polyethylene, ethyl vinyl acetate, polypropylene, polyurethane, nylon, PVC, silicone, EPDM, nitrile rubber, SBN, plastics, metal, and combinations thereof, whereby the sidewalls are flexible, resilient, and able to be compressed into conformance with opposing sides of the joint and maintain an expansive force thereagainst and maintain sealing engagement therewith.

Alternatively, the inner hollow body may be reinforced with a flexible metal or plastic spring-like member insertable therein or imbedded in the sidewall thereof whereby it exerts an outward force when the sealing strip is compressed into the joint and causes the hollow body to return to its original form when removed from the joint.

While various illustrative embodiments of the instant invention have been described hereinabove, it is to be understood that other modifications will be apparent and can be made by those skilled in the art without departing from the spirit and scope of the invention and the appending claims.

We claim:

1. A compressible, flexible, and resilient wedge shaped sealing strip for joints between opposing spaced walls of a structure comprising:
    a compressible, flexible, and resilient wedge shaped hollow body having an outer side wall extending around an internal passage including opposite side wall portions extending from an inner narrow side wall portion to an outer wider side wall portion, and
    a layer of cellular foam material secured to at least the opposite side wall portions of the body and adapted for conforming sealing engagement with the opposing spaced side walls of a structure.

2. A compressible, flexible, resilient wedge shaped sealing strip according to claim 1 wherein the wedge shaped hollow body is of trapezoidal shape and the opposite side wall portions are oppositely inclined and diverge outwardly from the inner narrow side wall portion to the outer wider side wall portion.

3. A compressible, flexible resilient wedge shaped sealing strip according to claim 1 wherein the layer of foam material is secured to and extends continuously around the entire outer side wall of the hollow body.

4. A compressible, flexible, resilient wedge shaped sealing strip according to claim 2 wherein the layer of foam material extends continuously from and is secured to the oppositely inclined side wall portions and to the inner side wall portion of the hollow body.

5. A compressible, flexible, resilient wedge shaped sealing strip according to claim 1 wherein the internal passage is of polygonal cross sectional shape.

6. A compressible, flexible, resilient wedge shaped sealing strip according to claim 5 wherein the internal passage is of hexagonal cross sectional shape.

7. A compressible, flexible, resilient wedge shaped sealing strip according to claim 1 wherein the internal passage is of trapezoidal cross sectional shape.

8. A compressible, flexible, resilient wedge shaped sealing strip according to claim 1 wherein the hollow body further comprises:
    a plurality of flexible expansion ribs and a plurality of internal passages extending radially outwardly from a center of the internal passage to the opposite side wall portion, the inner narrow sidewall portion, and the outer wider sidewall portion.

9. A compressible, flexible, resilient wedge shaped sealing strip according to claim 1 wherein the hollow body is made of an impervious elastomer material selected from a group consisting of natural rubber, synthetic rubber, polyvinyl chloride, polyethylene, ethyl vinyl acetate, polypropylene, polyurethane, nylon, silicone, nitrile rubber, neoprene, thermoplastic rubber, acrylic, SBN (styrene-butadiene-nitrile), EPDM (ethylene-propylene terpolymer), and combinations thereof.

10. A compressible, flexible, resilient wedge shaped sealing strip according to claim 9 wherein the foam material is selected from a group consisting of foamed polyvinyl chloride, foamed rubber, foamed polyethylene, foamed polypropylene, foamed urethane, foamed silicone, foamed neoprene, foamed nitrile rubber, foamed acrylic, foamed thermoplastic rubber, foamed EPDM, and combinations thereof.

11. A compressible, flexible, resilient wedge shaped sealing strip according to claim 1 wherein the hollow body further comprises:
    a plurality of flexible retainer fins protruding from the opposite side wall portions and adapted to be bent downwardly by engagement with the spaced walls of the structure and thereby hold the sealing strip in the joint therebetween.

12. A compressible, flexible, resilient wedge shaped sealing strip according to claim 1 wherein the compressible, flexible, and resilient wedge shaped hollow body is made of a material selected from a group consisting of plastics, metals, and combinations thereof.

* * * * *